United States Patent [19]
Giordani

[11] 3,936,069
[45] Feb. 3, 1976

[54] COLLAPSIBLE BABY STROLLER

[76] Inventor: Pietro Giordani, Via Rupe, 19, Sasso Marconi, Italy

[22] Filed: Jan. 20, 1975

[21] Appl. No.: 542,735

[30] Foreign Application Priority Data
    Jan. 24, 1974   Italy ................................ 12442/74

[52] U.S. Cl. .............................................. 280/36 B
[51] Int. Cl.² ........................................ B62B 11/00
[58] Field of Search ................. 280/36 B, 41 B, 42; 297/45

[56] References Cited
UNITED STATES PATENTS

| | | | |
|---|---|---|---|
| 3,390,893 | 7/1968 | MacLeran | 280/36 B X |
| 3,848,884 | 11/1974 | Lines | 280/36 B |

*Primary Examiner*—Robert R. Song
*Attorney, Agent, or Firm*—Guido Modiano; Albert Josif

[57] ABSTRACT

Collapsible baby stroller having a seat member, wheels for moving the stroller on the ground, a handle member for carrying and pushing the stroller and an articulated lever system cooperating in supporting the seat member and the wheels. The configuration of the lever system is transformable from a collapsed configuration into an unfolded configuration and vice versa. The stroller has a control rod for the lever system, a rigid supporting body structure slidingly supporting the control rod shiftable with respect to the supporting body structure. The control rod causes the articulated lever system and the seat member and wheels carried by it to assume a collapsed configuration when the control rod is shifted into one position thereof and it also causes the articulated lever system and the seat member and wheels carried by it to assume an unfolded configuration when the control rod is shifted in another position thereof.

9 Claims, 10 Drawing Figures

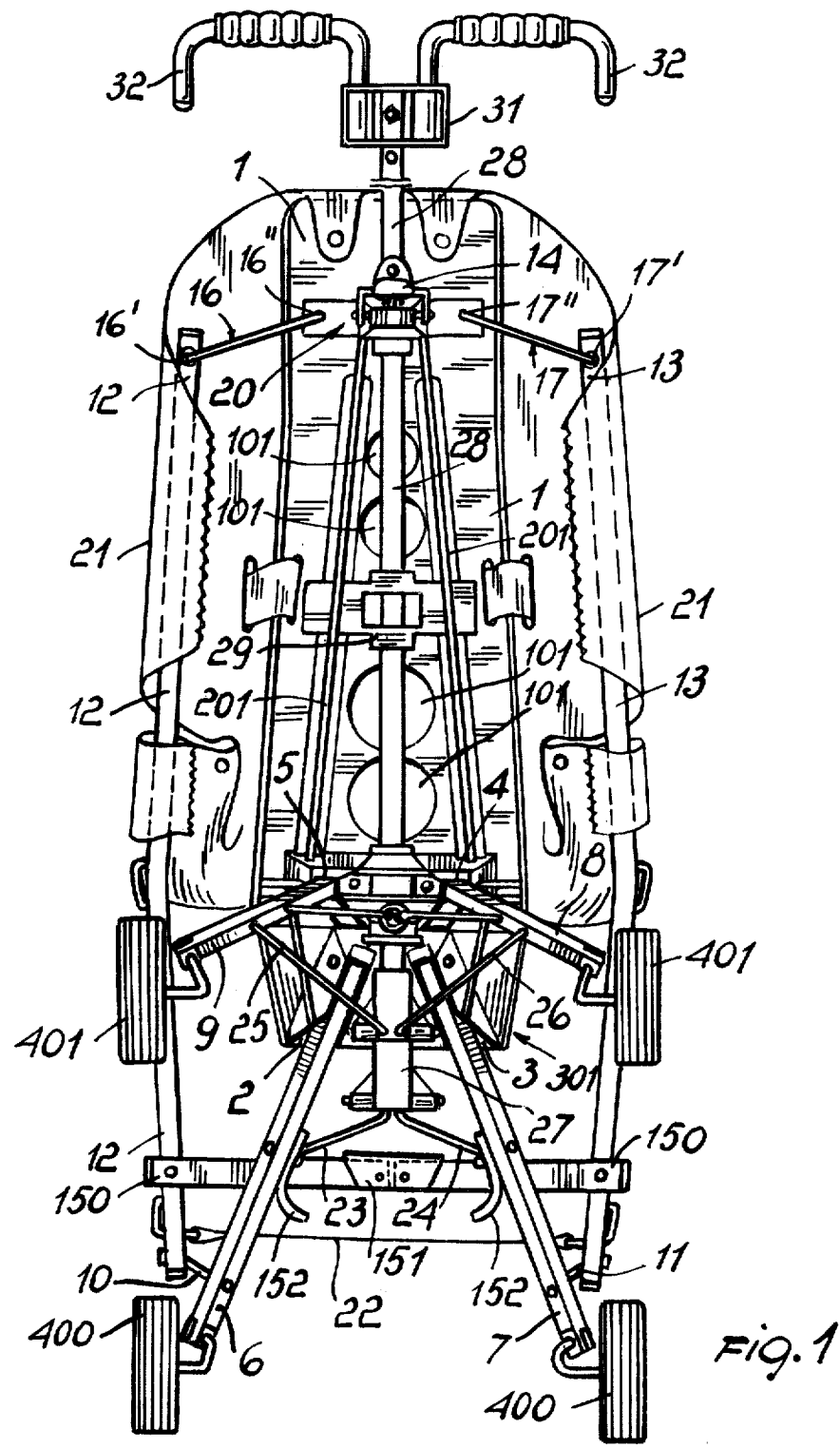

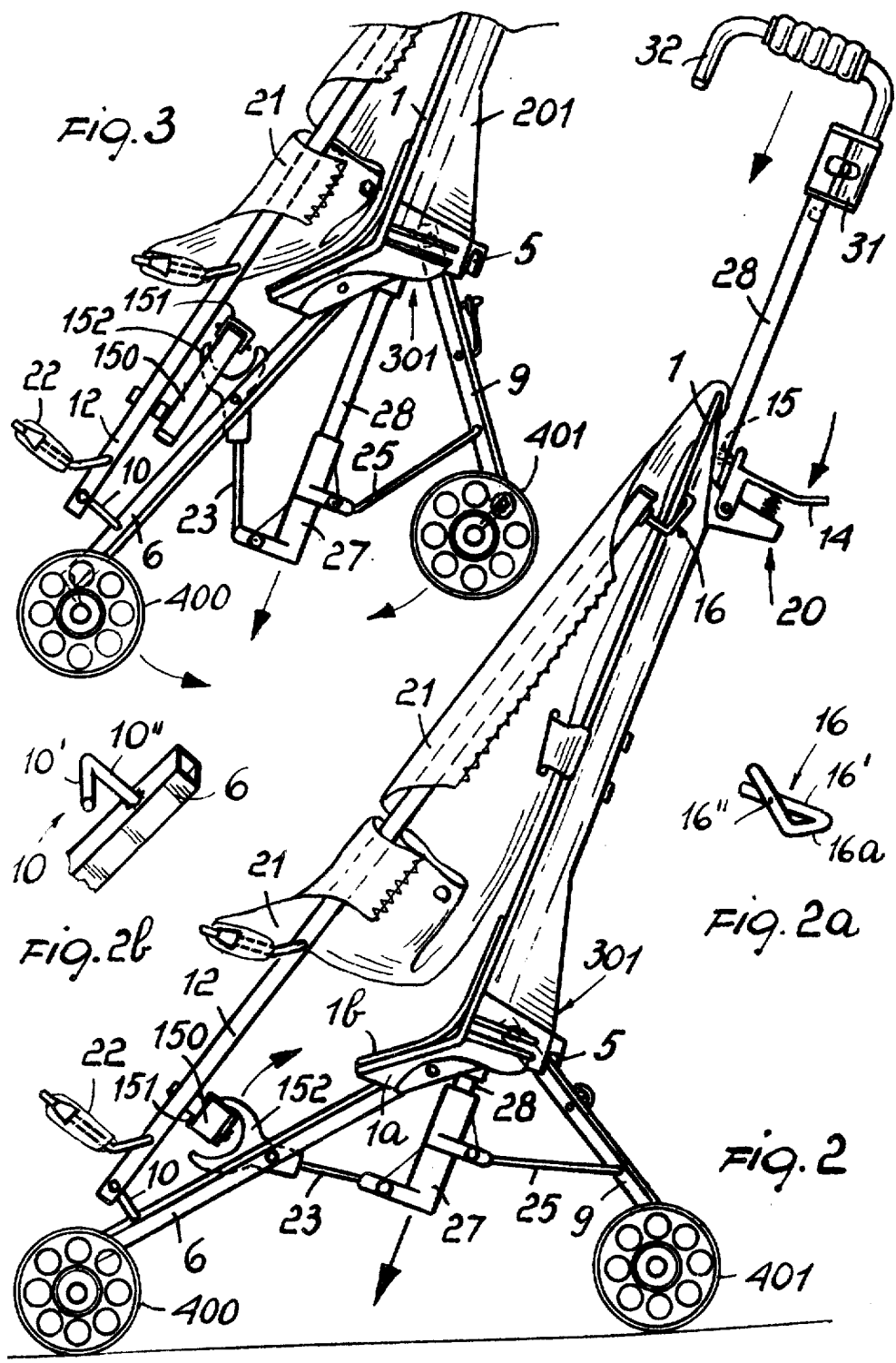

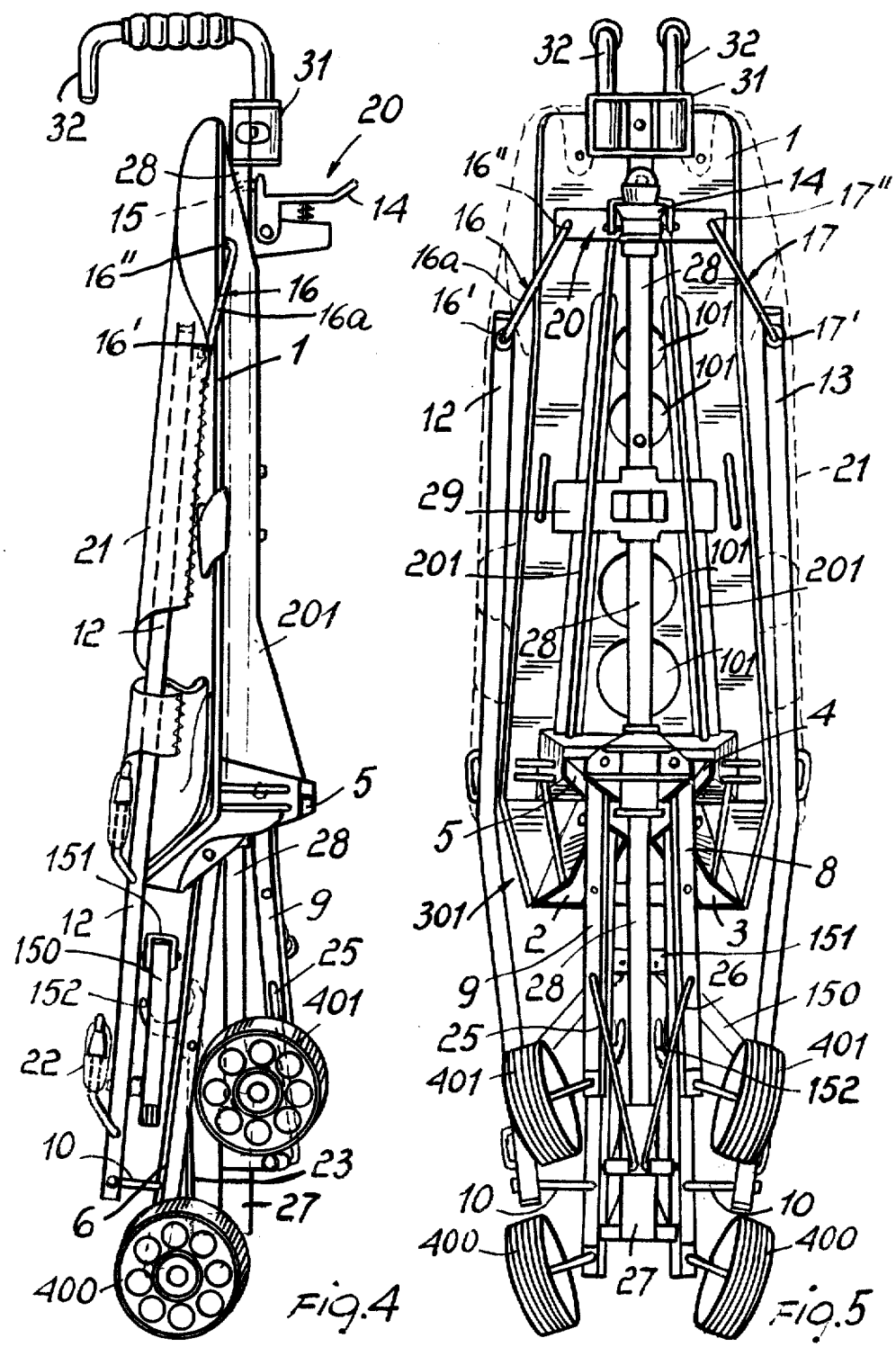

U.S. Patent  February 3, 1976  Sheet 4 of 4  3,936,069
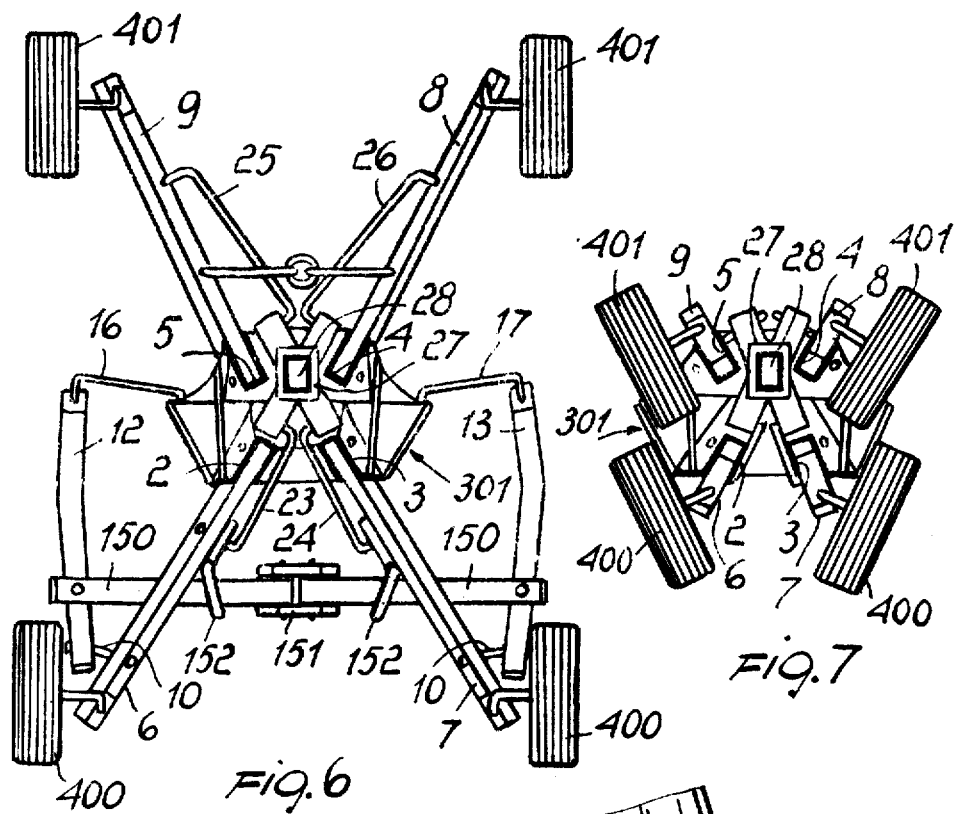
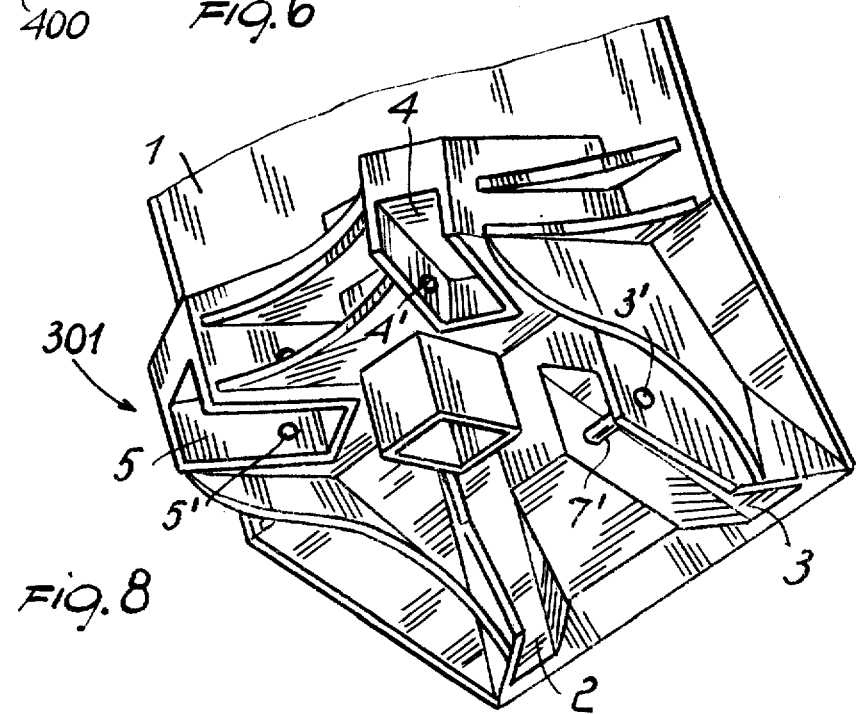

COLLAPSIBLE BABY STROLLER

BACKGROUND OF THE INVENTION

The present invention relates to a collapsible baby stroller.

Attempts have been made to provide baby strollers of variable dimensions, which are conveniently carried in the manner of a walking stick even on buses or analogous transport means when in the maximum folding or collapsed position.

These strollers are formed by a number of mutually articulated tubular rod elements, which provide both the wheel supports, the handgrips and the seat attachments. A feature of these tubular elements is that their folding and unfolding movement is performed in a manner similar to the opening of a book or compass. In fact the articulated rod system of these strollers is such that substantially two groups of articulated rods are provided which in folded configuration are approximately coplanar. These coplanar groups of rods are arranged rotatable about an axis extending approximately breadthwise with respect to the overall extension of the stroller, so that a book like or compass like unfolding and folding may be obtained about the said axis. The said articulated rods are furthermore mutually interconnected so that their reciprocal distances vary with the degree of opening of the actual stroller. Transversely, that is width-wise, these types of strollers have the characteristic of expanding or narrowing through the action of diagonally arranged cross-pieces interconnecting in an articulated fashion the non-corresponding rods of the two sides. In other words the diagonal cross-pieces vary their reciprocal angles and can gain or lose transversely the space respectively lost or gained longitudinally because of the variations in the mutual positioning of said side tubes during the book-like opening or closing of the stroller.

Evidently such strollers require numerous component parts such as tubular elements and links and remarkable care in the study of the kinematic movements thereof. Moreover it is necessary to form a large number of articulations to interconnect the tubular elements. These articulations are costly and are in addition the cause of possible breakages and bindings. On the whole therefore the structure of these previous strollers are relatively complex and costly, as well as rather cumbersome. This last drawback is particularly annoying since manoeuvrability should be the basic characteristic of these strollers.

It should be observed that these previous strollers have a relatively short span between the sides when in a position of maximum opening, so that the baby seated therein is in a rather uncomfortable position. This drawback is a direct result of the above described structure, in that the maximum possible expansion of the strollers in a transversal sense is a characteristic depending directly on the overall dimensions of the actual stroller, the positions of complete opening and closure in a longitudinal sense being substantially constrained and unmodifiable, for reasons of encumbrance and ease of handling. The same applies in respect of the change of configuration in the transversal sense for the position of maximum closure. It therefore happens that in practice, since the stroller must not be too large and heavy, its maximum transverse dimension must be kept within narrow limits and in some cases insufficient.

SUMMARY OF THE INVENTION

An object of the present invention is to provide a baby stroller whose structure is such that it overcomes the above specified inconveniences, by having a framework with a reduced number of components, structurally simple and economical, as well as being light and having an ample span between the sides of the seat element in working or unfolded position, and finally collapsible with one simple operation which does not require bending down or particular physical exertions.

These and other objects, which will be more evident hereinafter, are attained by the collapsible baby stroller according to the invention, having at least one seat member, wheels for moving the stroller on the ground, at least one handle member for carrying and pushing the stroller and an articulated lever system cooperating in supporting said seat member and said wheels, the configuration of said lever system being transformable from a collapsed configuration into an unfolded configuration and vice versa, characterized in that the stroller further comprises a control rod for said lever system, a rigid supporting body structure slidingly supporting said control rod shiftable with respect to said supporting body structure from at least one position thereof into at least another position thereof, said articulated lever system which cooperates in supporting said seat member and said wheels having a first group of articulated component members linked to said rigid supporting body structure and a second group of articulated component members linked to said control rod, said control rod causing said articulated lever system and said seat member and wheels carried by it to assume a collapsed configuration when the control rod is shifted into said one position thereof and causing said articulated lever system and said seat member and wheels carried by it to assume an unfolded configuration when the control rod is shifted into said other position thereof.

BRIEF DESCRIPTION OF THE DRAWINGS

Further characteristics and advantages of the invention will be more evident from the description of a preferred but not exclusive embodiment of the stroller, illustrated by way of a non-limiting example in the accompanying drawings in which:

FIG. 1 is a rear view of the stroller according to the invention in open position;

FIG. 2 is a lateral view of the stroller illustrated in FIG. 1;

FIGS. 2a and 2b show details of pivot elements in perspective views;

FIG. 3 shows the movements of a few mobile parts of the stroller, seen laterally, while being folded;

FIG. 4 is a lateral view of the stroller in folded or collapsed position or configuration;

FIG. 5 is a rear view of the stroller in folded or collapsed position;

FIG. 6 shows the structure of the stroller from underneath in open position or configuration;

FIG. 7 is a view from underneath of the stroller similar to the one shown in the preceding figure but with the stroller in folded or collapsed position;

FIG. 8 shows a structural detail of the stroller according to the invention.

DESCRIPTION OF A PREFERRED EMBODIMENT

With reference to the above Figures, the stroller comprises a rigid supporting body structure with a prevalently longitudinal extension consisting of a back rest portion 1 having a flat structure, preferably made of sufficiently rigid plastics material, with weight reducing holes 101 and hollow stiffening ribs 201 on the rear side. The lower end of the back rest 1 extends at an angle with respect to the back rest to form a seat supporting shell formation 1a on the upper side of which an arcuated plate 1b is fixed by non visible rivets to provide a smooth resting surface for the flexible bag-like seat member 21, as best visible in FIG. 2. On the rear side of the seat supporting shell formation 1a there is provided, as an integral part of the supporting body structure, a monoblock formation 301. This monoblock structure 301 may also be made as a separate piece fixed to the lower end of the back rest portion 1 and in such case the monoblock structure is preferably made of metal. As best visible in FIG. 8 the monoblock formation has on its rear downwardly facing side, channel shaped supports 2, 3, 4 and 5 for the stroller's foldable legs 6, 7, 8 and 9, respectively (FIG. 6). The longitudinal center lines of the channel shaped supports all diverge downwardly with respect to the rod 28 which will be described later. The center lines of the channel shaped supports 4 and 5 extend transverse to the back rest portion 1 and diverge symmetrically with respect to an immaginary vertical plane containing the centerline of rod 28, whereas the center lines of the channel shaped supports 2 and 3 extend symmetrically with respect to the said vertical plane and substantially tangentially to the seat supporting shell formation 1a as best visible in FIG. 2, taking into account that in this Figure the center lines of the legs 6 and 9 coincide with the center lines of the channel supports 2 and 5 when the legs are in working or unfolded position. The legs 6, 7, 8 and 9, which have a hollow rectangular cross-section are hinged with one end thereof in the channel shaped supports 2, 3, 4 and 5, respectively, by means of pivots supported in bush-like holes of the channel shaped supports, of which only holes 3', 4' and 5' and the pivot 7' of leg 7 are visible in FIG. 8.

The legs 6 and 7 are of the same length and are provided at their extremities with the front wheels 400 independent from one another. Also the legs 8 and 9 are of the same length which is however shorter than the preceding length. The legs 8 and 9 are provided at their extremities with the rear wheels 401 also independent from one another. When the stroller is in working or unfolded position, the hinged ends of the legs 6, 7, 8 and 9 rest against the bases or bottom walls of the respective channel supports 2, 3, 4 and 5 and are prevented by the flanges or side walls of these latter from carrying out undesirable swinging or bending movements.

The sidewalls of the channel shaped supports 2 through 5 may have such an orientation, that the articulation pivots for the legs secured therein are all parallel to the horizontal plane or the plane on which the wheels of the stroller rest on the ground when the stroller is in unfolded or working or operative position. However, advantageously the said channel shaped supports may have also such an orientation that the said articulation pins are more or less inclined to the said resting or horizontal plane. They are necessarily perpendicular to the converging planes of symmetry of the channel shaped supports. These converging planes of symmetry may be vertical or inclined with respect to the vertical. In this latter preferable case during the folding and unfolding movement of the legs 6, 7, 8 and 9 the legs and their wheels 400 and 401 will perform a rotatory movement having a component effecting an angular movement also about a vertical axis as visible when comparing the angular positions of the wheels 400 and 401 shown in FIGS. 6 and 7. By virtue of this angular motion the wheels may be moved still closer to each other in the collapsed or folded position of the stroller, without mutual interference, as visible in FIG. 7.

Furthermore, since the front legs 6, 7 have a greater length than the rear legs 8, 9 in folded position wheels 401 are arranged above wheels 400 thereby further reducing the occupied space.

Articulated tie-rods 23, 24, 25 and 26 have each one extremity thereof hinged to respective lugs of a block 27 and the other extremity thereof hinged to the legs 6, 7, 9 and 8 in an intermediate point thereof, respectively. The block 27 is attached by not shown rivets to the lower end of the aforementioned rectilinear tubular control rod 28 which is preferably rectangular in cross-section and which is supported in an axially slidable manner in aligned sleeve like guide seats provided in the members 301, 29 and 20 arranged at a distance from each other on the rear side of the back rest portion 1 of the rigid supporting body structure as an integral part thereof. As visible in FIG. 6, the ends of the tie rods 23, 24, 25 and 26 are bent to form pivot-like extensions perpendicular thereto and journalled in bush-like holes provided in the respective legs and in the lugs of the block 27. The pivot-like ends of each tie rod are parallel to each other and to the hinge axis of the hinge connection between the respective leg and the monoblock structure. Thus for example the two opposite pivot-like ends of the tie-rod 24 are parallel to each other and to the hinge axis defined by the pivot 7' of the monoblock structure 301 on which leg 7 is hinged. The same considerations are valid for the other tie-rods and respective legs. In this way the legs and the tie rods may be rotated in planes perpendicular to the hinge axes of the legs, such as the aforementioned planes of symmetry of the channel shaped supports 2 through 5, which are preferably slightly inclined to the vertical and mutually convergent.

It will be appreciated that in this way part of an articulated lever system is obtained by means of which the legs 6, 7, 8 and 9 may be folded and unfolded in an umbrella like manner by axially shifting the control rod 28.

The stroller comprises further component parts of the lever system designed to support in a collapsible manner the bag like seat member thereof. These additional component parts comprise lateral bars 12 and 13 symmetrically arranged at both lateral sides of the rigid back rest 1.

At the upper end thereof, the bars 12 and 13 are linked to the previously described foldable lever system by U-shaped links 16 and 17 each hinged with one arm 16', 17' thereof to the upper ends of bars 12 and 13 respectively and with the other arm 16'', 17'' thereof to the lug member 20 provided near the upper end of the rigid back rest 1 and cast integral therewith. The arms 16' and 16'' are both perpendicular to the connecting portion 16a thereof, but are inclined with respect to each other as best visible in FIG. 2a. In this way bar 12 may perform a combined swinging movement both about the arm 16' and 16''. The same considerations apply for arms 17' and 17'' and bar 13. In fact arms 16', 16'', 17' and 17'' act each as pivots received in bush-like holes provided for the purpose in bars 12, 13 and the lug member 20.

At the lower end thereof the bars 12 and 13 are linked to the legs 6 and 7, near the lower ends thereof, through L-shaped pivots 10 and 11. The L-shaped pivot 10 is illustrated in FIG. 2b. Pivot 11 is similar in structure. In this way bar 12 may perform a relative swinging movement with respect to the leg 6 both about the pivot arm 10' and the pivot arm 10'' of the pivot 10 while leg 6 is swung about its hinge support 2. In other words the hinge connections defined by L-shaped pivot 10 and U-shaped pivot 16 are such as to allow the bar 12 to follow the movement of leg 6. The illustrated mutual relationship between the hinge axes and their angular position are such that during the unfolding swinging movement of leg 6 durich which wheel 400 of leg 6 is moved away from the control rod 28 in an approximately radial manner, also the bar 12 follows approximately this movement by moving away from the control rod 28 both widthwise and breadthwise i.e. in a direction parallel to the flat back rest member 1 and in a direction transverse thereto. During the folding movement the opposite occurs. The same considerations apply also for bar 13 and leg 7 so that an umbrella like unfolding and folding action is obtained for the system containing legs 6 through 9 and bars 12 and 13. Thus not only the wheel carrying ends of the legs 6–9 are moved approximately radially towards and away from the control rod 28, but also the bars 12 and 13 are moved towards and away with respect to each other and with respect to the immaginary plane defined by the back rest structure thereby forming in unfolded position foldable armrests for the baby. It will be further noted that bar 12, the rigid body structure 1, the link 16 and the leg 6 form a kind of articulated stereoquadrilateral. The same considerations apply also for bar 13, rigid body structure 1, link 17 and leg 7.

The seat member consists of a pocket 21 of flexible material with suitable padding. It is fixed to the front side of the back 1 and also to the bars 12 and 13 so as to provide the side and sitting portions of the seat as well as a lining for the back rest 1. A flexible band 22 acting as foot-rest is attached by its ends to the lower portion of the bars 12 and 13.

The rod 28 projects not only from below but also from above the back rest 1 where its extremity is rigidly provided with a support 31 preferably made of plastics material wherein two handgrips 32 in the shape of umbrella handles can rotate and which serve to push or pull the stroller.

Means for blocking the sliding axial movement of the rod 28 with respect to the back 1 are also provided. Said means consist of a handle 20 rigid to the back 1, on its upper rear portion, and provided with a mobile lever element 14 having a pin 15 insertable within appropriate holes provided in succession along the rod 28. This insertion is aided by the presence of a compression spring situated between the portion 14 of the handle and the fixed portion of the handle 20.

To improve the stability of the stroller when in maximum open position, there is provided a foldable cross-piece 150 arranged between and articulated with its opposite ends onto the bars 12 and 13. The cross-piece 150 is made of two sections pivoted in articulated fashion on a connection element 151 at the center of the cross-piece. The articulated cross-piece 150 is arranged substantially rectilinearly when the bars 12 and 13 are at their maximum mutual distance. In folded position the articulated cross-piece 150 is folded to form an acute angle with its sections at the connection element 151. In order to aid the opening and closing movements of the articulated cross-piece 150, two forks 152 are provided, whose diverging extremities engage in unfolded position the articulated cross-piece 150 in an intermediate position thereof. The opposite estremity of each fork 152 is rigid to the respective tie-rod 23 or 24 of which they are substantially an extension past the pivot point of the tie-rods themselves with the legs 6 and 7 (FIG. 2).

In folded position the forks 152 are moved away from the cross-piece 50.

The operation of the stroller is the following.

To fold the stroller, the handgrips 32 are rotated to project forwardly until they are mutually juxtaposed (FIGS. 2, 4 and 5) and then the handle 20 and the handgrips 32 are grasped. The lever element 14 is pressed thereby freeing the pin 15 from the hole of the rod 28 to allow the rod 28 to move axially in its guide sleeves. The stroller must be kept raised from the ground or resting on its rear or front wheels. At this point the rod 28 is pushed downwardly so that the block 27 rigid therewith is moved downwardly away from the monoblock structure 301, entraining therewith the articulated lever system linked thereto in a manner best visible when comparing FIG. 2 showing the unfolded position of the stroller with FIG. 3 showing an intermediate folded position thereof. The opposite occurs when the rod 28 is moved from the folded position upwards thereby entraining the block 27 rigid therewith towards the monoblock structure 301.

During the indicated folding and unfolding movement the already described approximately radial movement of wheel carrying ends of the legs 6–9 and the swinging movement of the bars 12 and 13 occur. It will be appreciated that the articulated lever system comprising the tie-rods 23–26 and the legs 6–9 has a dead point in the sense that the movement in any direction of the control rod 28 beyond this dead point will cause the legs 6–9 to fold or move towards the control rod 28. The dimensions of the component parts of this articulated lever system is so selected that in the unfolded position as shown in FIG. 2 the control rod is positioned slightly beyond the dead point upwards. In this way there is a tendency of the lever system when under the action of the load to attain its maximum expanded position i.e. to urge the lever system in the dead point position of the rod 28. In a similar manner, when the control rod 28 is pushed past the dead point position the maximum tensioning of the component parts of the lever system occurs which generates an elastic resistance against the pushing action which abruptly disappears as soon as the dead point position is overcome. Thus a snap action behaviour of the system occurs when passing beyond the dead point into the unfolded configuration thereof.

It will be further appreciated that in the unfolded position the fork 152 is urged to press its upper fork prong downwardly against the cross-piece 150 as shown in FIG. 2. In this way the unfolded configuration is locked. In addition in the unfolded position pin 15 reaches the lower hole of the rod 28 and is automatically inserted therein thereby additionally locking the system in its unfolded position. At the beginning of the folding action, after having disengaged the pin 15 from its hole on the rod 28 when rod 28 is downwardly pushed, the fork 152 is rotated clockwise as shown in FIG. 2 so that the lower prong of fork 152 reaches the cross-piece 150 and pushes it upwardly thereby causing the two sections of the cross-piece 150 to fold and disengage from the fork 152. It will be thus understood that under the action of the load or if the bars 12 and 13 were simply pushed one towards the other, the articulated cross-piece would prevent any movement. Once the stroller is in the folded position indicated in FIGS. 4 and 5, it is prevented from opening under the stress of its frame when carried by its handles 32, by inserting the pin 15 of the handle 20 in a hole provided in the rod 28 which is thus blocked in its guide channel 29.

The invention attains the proposed objects. In fact the tubular elements are reduced to a minimum indispensable number, and practically limited to the lateral rods, the legs and the longitudinal rod. The number of articulations employed are therefore also reduced and the kinematics is much more simple. Consequently the stroller is lighter than present day ones and less costly. Furthermore the opening and closing thereof do not require bending down or physical exertions and the elements to be grasped, such as the handles and handgrips, are arranged close to each other and within reach of the hands on the upper portion of the stroller.

A very advantageous characteristic of the stroller is the fact that the lateral rods are capable of acquiring a remarkable mutual transverse distance, since the dimensions of the third levers 16 and 17, of the articulations 10 and 11, and the degree of opening of the legs 6 and 7 may be provided as desired without influencing the overall dimensions of the stroller, in collapsed condition.

The invention thus conceived is susceptible to numerous modifications and variations, all falling within the scope of the inventive idea. Furthermore all the details may be substituted by technically equivalent elements.

In practice the materials employed, as well as the dimensions may be any as required.

I claim:

1. A collapsible baby stroller having at least one seat member, wheels for moving the stroller on the ground, at least one handle member for carrying and pushing the stroller and an articulated lever system cooperating in supporting said seat member and said wheels, the configuration of said lever system being transformable from a collapsed configuration into an unfolded configuration and vice versa, characterized in that the stroller further comprises a control rod for said lever system, a rigid supporting body structure slidingly suporting said control rod shiftable with respect to said supporting body structure from at least one position thereof into at least another position thereof, said articulated lever system which cooperates in supporting said seat member and said wheels having a first group of articulated component members linked to said rigid supporting body structure and a second group of articulated component members linked to said control rod, said control rod causing said articulated lever system and said seat member and wheels carried by it to assume a collapsed configuration when the control rod is shifted into said one position thereof and causing said articulated lever system and said seat member and wheels carried by it to assume an unfolded configuration when the control rod is shifted into said other position thereof.

2. A collapsible baby stroller according to claim 1, characterized in that said rigid supporting body structure has an elongated substantially flat extension and has on one side thereof a surface forming the back rest of the stroller and on the other side thereof means for slidably supporting said control rod, said means allowing a slidable movement of said rod in the longitudinal direction thereof.

3. A collapsible baby stroller according to claim 1, characterized in that said first group of articulated component members of the lever system comprises a number of legs having one end thereof hinged to said supporting body structure near the lower end thereof, said legs having wheels attached to the other end thereof, a pair of linking rod-like elements hinged with one end thereof to said rigid supporting body structure near the upper end thereof laterally at a distance from one another, a pair of lateral bars having one end thereof hinged to the other end of said pair of linking rod-like elements, said lateral bars having the other end thereof hinged to a pair of said legs near the wheel supporting ends thereof, and characterized in that said second group of articulated component members comprises tie rod members hinged with one end thereof to the lower end of said control rod and with the other end thereof to each of said legs in an intermediate point thereof.

4. A collapsible baby stroller according to claim 3, wherein said pair of lateral bars, said pair of legs, said pair of linking rod-like elements and said rigid supporting body structure form on each lateral sides of said rigid supporting body structure an articulated quadrilateral whose members are movable in planes converging towards a zone close to said control rod.

5. A collapsible baby stroller according to claim 4, characterized in that said pair of lateral bars form arm rests in the unfolded position of the quadrilateral and wherein said seat member is in the form of a flexible spreadable pocket having its lateral margins attached to said bars and having its intermediate portion leaning partially against said back rest surface and partially against a seat supporting extension thereof, at least in the unfolded position of the stroller.

6. A collapsible baby stroller according to claim 3, characterized in that said legs and said tie rods articulated therewith extend in immaginary planes converging towards a zone close to said control rod.

7. A collapsible baby stroller according to claim 3, characterized in that said pair of legs are arranged in front of the immaginary center line plane defined by said supporting body structure and the legs of said pair of legs having a length greater than the length of the remaining legs.

8. A collapsible baby stroller according to claim 3, characterized in that the legs have pivots with which the legs are hinged to said supporting body structure said pivots being perpendicular to vertical planes converging towards a zone close to said control rod.

9. A collapsible baby stroller according to claim 3, characterized in that the legs have pivots with which the legs are hinged to said supporting body structure said pivots being perpendicular to planes converging towards a zone close to said control rod, said planes being slightly inclined to the vertical.

* * * * *